Oct. 14, 1969 W. LOBUR 3,473,086
HIGH DUTY-CYCLE E.D.M. CIRCUITRY
Filed July 11, 1966 2 Sheets-Sheet 1
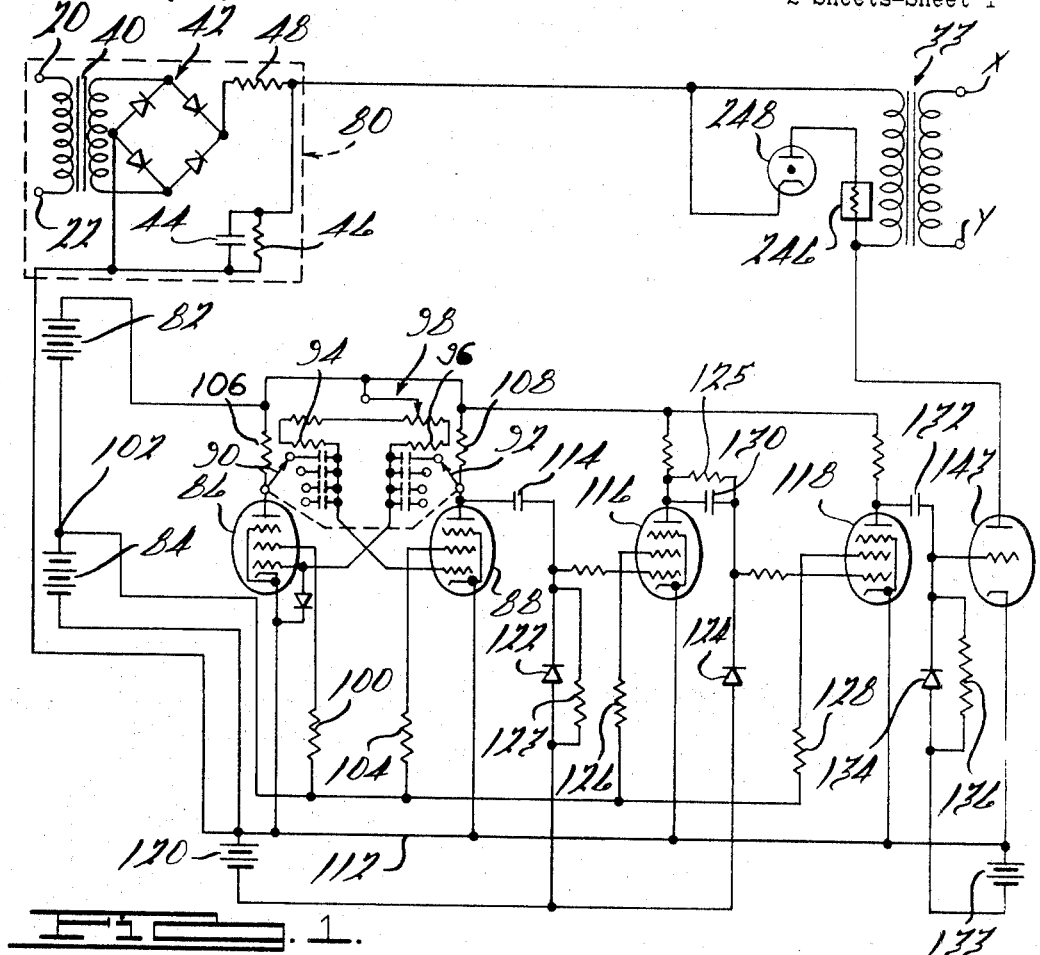
FIG. 1.
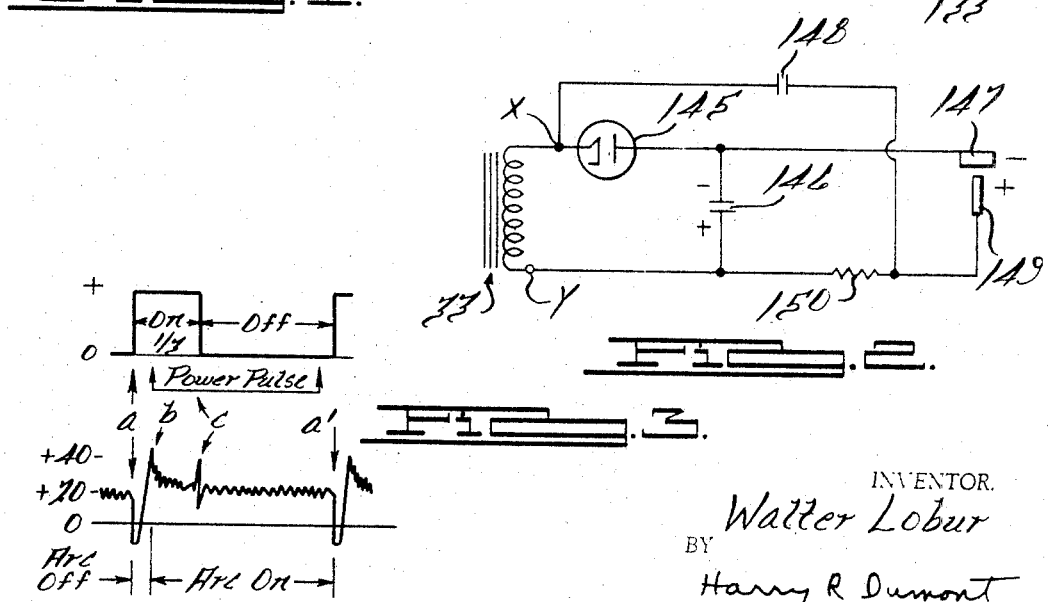
FIG. 2.
FIG. 3.
INVENTOR.
Walter Lobur
BY
Harry R Dumont
ATTORNEY

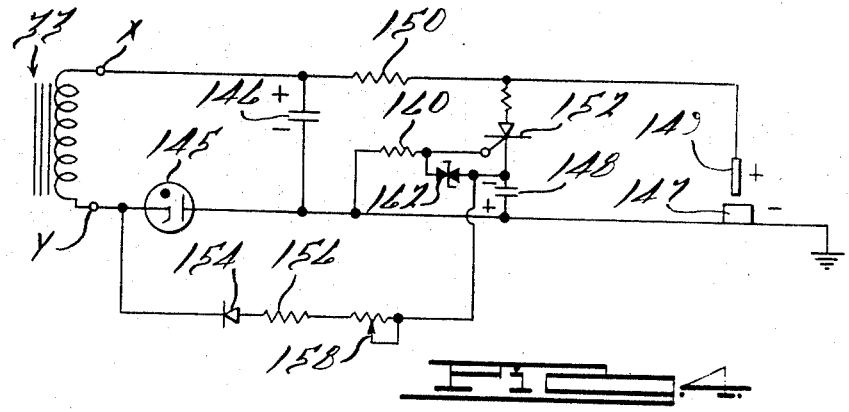
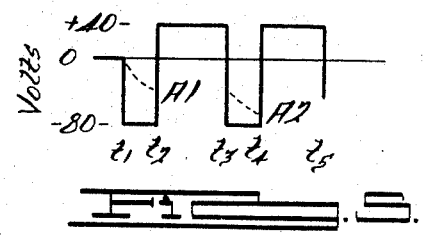
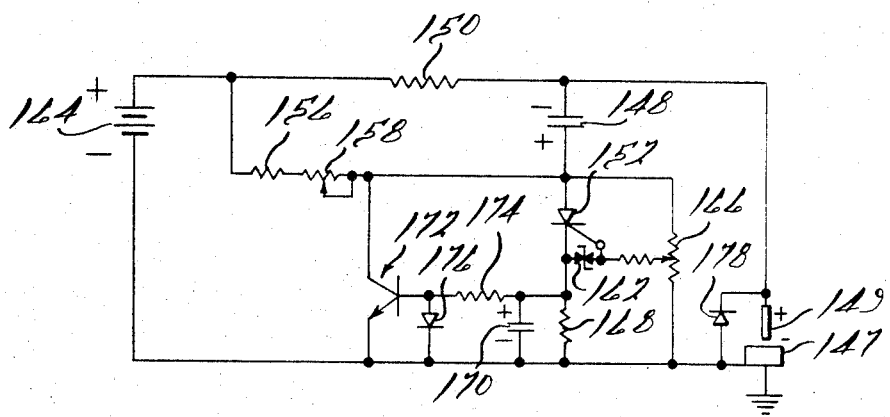
INVENTOR.
*Walter Lobur*
BY
*Harry R Dumont*
ATTORNEY

United States Patent Office 3,473,086
Patented Oct. 14, 1969

3,473,086
HIGH DUTY-CYCLE E.D.M. CIRCUITRY
Walter Lobur, Clawson, Mich., assignor to Elox Corporation, Troy, Mich., a corporation of Michigan
Filed July 11, 1966, Ser. No. 564,238
Int. Cl. H05b 37/02, 39/04, 41/14
U.S. Cl. 315—241                                    7 Claims

ABSTRACT OF THE DISCLOSURE

A power supply circuit for electrical discharge machining particularly suitable for long on-time pulse machining. The circuit includes a gap transformer, a relatively large magnitude capacitor and a relatively small magnitude capacitor. The first capacitor is periodically chargeable and dischargeable across the gap to provide a machining pulse while the second capacitor is chargeable to a reverse polarity to turn off each such pulse.

---

In electrical discharge machining, electrical machining power pulses are passed across a gap between a tool electrode and a conductive workpiece through a dielectric fluid medium to provide workpiece material removal at a precisely controlled rate and within relatively close tolerance limits. The dielectric fluid utilized is a self-restoring, ionizable fluid such as kerosene, transformer oil and the like. A suitable servo feed means is provided to maintain optimum gap spacing between electrode and workpiece as machining progresses.

I have found that substantial improvement in wear ratio as between electrode and workpiece becomes possible when the machining pulses employed have a relatively long on-time, i.e., between 90 and 98%. It is possible to obtain for all practical purposes a "no-wear" electrode condition when machining power pulses of the above mentioned type are used with a graphite electrode. I have further found that it is possible to provide an electrical discharge machining power supply which combines the advantages of using electron tubes as the electronic switching means in conjunction with a machining gap transformer, particularly with regard to the fast rise and fall characteristics of pulse output and the step down ratios available. A major problem, however, in the employment of gap transformers is that the limitation on pulse on-time lies between 30 and 50%.

Accordingly, it is an object of my invention to provide an improved electrical discharge machining power circuit in which the machining pulses available from electronic switching devices and gap transformers is substantially lengthened above the limits normally obtainable from these devices.

It is a further object of my invention to provide an electrical discharge machining circuit in which a brief reverse polarity waveform is generated and employed to extinguish gap conduction without causing reverse firing of the gap and in which substantially lengthened machining pulses of uniform energy content are provided in a controllable manner to the gap.

It is a still further object of my invention to provide an improved electrical discharge machining power circuit in which a unidirectional machining pulse is modulated by a reverse polarity charged capacitor to provide gap turn-off and in which a relatively long on-time pulse is subsequently initiated through the controlled discharge of a second larger magnitude gap capacitor.

It is a still further object of my invention to provide an improved electrical discharge machining power supply capable of furnishing long on-time machining pulses wherein an electronic triggering means is provided in conjunction with a gap turn-off capacitor to selectivey lower the frequency of the machining gap pulse output.

It is an additional object of this invention to provide an improved low frequency, long on-time operating electrical discharge machining power circuit in which an electronic triggering device is employed in conjunction with a substantially constant DC source and a gap turn-off capacitor for furnishing pulses to the gap.

The unique features, additional objects and advantages of the present invention and the manner in which these may be achieved may be more clearly understood by reference to the following detailed description of several representative embodiments of the invention when taken in connection with the accompanying drawings, in which:

FIGURE 1 is a schematic drawing showing a pulse generator of the astable multivibrator type in which an electronic switch is triggered to provide a unidirectional pulse output to a transformer output stage;

FIGURE 2 is a schematic drawing showing one form of gap output and pulse lengthening stage used in conjunction with the pulse generator circuit of FIGURE 1;

FIGURE 3 is a voltage waveform diagram with the upper portion showing the pulse generator output to the gap transformer and the lower portion showing gap voltage conditions during machining operation;

FIGURE 4 is a modification of the circuit of FIGURE 2 in which a silicon controlled rectifier is employed with a turn-off gap capacitor for selectively lowering the frequency of output to the gap;

FIGURE 5 is a voltage waveform diagram illustrating the pulse skip mode of frequency reducing operation of the circuit of FIGURE 4; and FIGURE 6 is a further modification of my invention in which the low frequency machining pulses are directly generated by a silicon controlled rectifier and a turn-off gap capacitor without requirement of an external pulse generator.

With more particular reference to the circuit of FIGURE 1, the pulse generator includes an electronic switch or bank of electronic switches having their principal electrodes connected in series with the primary of a gap transformer 33 and the main power supply 80. By "electronic switch" I mean any electronic control device having three or more electrodes comprising at least two principal or power electrodes acting to control current flow in the power circuit, the conductivity between the principal electrodes being controlled by a control electrode within the switch whereby the conductivity of the power circuit is controlled statically or electrically without movement of mechanical elements within the switch. Included in this definition by way of example are vacuum tubes and transistors in which turn-off is accomplished by a control voltage applied to the control electrode and in which turn-off is accomplished automatically in response to the removal of the control voltage. The electronic switch 143 is preferably of the vacuum tube type in which turn-off is accomplished by a control voltage to the control electrode or grid of the switch and in which turn-off is accomplished automatically in response to the removal of the control voltage. Provision is made for furnishing the pulses to the machining gap by connecting the secondary winding of transformer 33 to the machining gap with the terminals X and Y similarly marked to indicate their connection in the circuits of FIGURES 2 and 4 hereinafter.

Main power supply 80 employed includes a transformer 40 having its primary winding connected across AC input terminals 20, 22 and having its secondary winding connected to bridge rectifier 42. Connected across the pulsating DC output of bridge 42 is filter capacitor 44 of the electrolytic type which capacitor is paralleled by resistor 46 and connected in series with a limiting resistor 48.

The pulsing means for tube 143 is an electronic multivibrator of the astable operating type. Voltage supplies 82 and 84 are included which may be for example of the order of several hundred volts sufficient to provide the necessary operating voltages for the multivibrator and subsequent amplifiers which are required. All power supplies with the exception of power supply 80 are shown as DC sources. In practice, these power supplies employ AC inputs, with rectifier and filter capacitors after the manner indicated for power source 80.

The multivibrator used comprises pentode type tubes 86 and 88 having their plates and control grids cross-connected through RC coupling networks for operating in the astable mode. The coupling networks include ganged capacitor switches 90 and 92, resistors 94 and 96, and the variable resistance of potentiometer 98. It will be seen that by the selective adjustment of potentiometer 98, an increase or decrease in resistance will serve to preset the multivibrator on-time. The screen grids of tubes 86 and 88 are connected to screen voltage tap 102 through limiting resistors 100 and 104, respectively. The plates of tubes 86 and 88 are connected to the positive terminal of voltage supply 82 through load resistors 106 and 108 and to lead 110. The cathodes of tubes 86 and 88 are connected to the negative terminal of power supply 84 through lead 112.

The output of multivibrator tube 88 is fed through coupling capacitor 114 into following amplifier stages which comprise, in the present instance, pentode tubes 116 and 118. The output signals of the several stages are clamped to negative bias voltage 120 by diodes 122 and 124 as shown. Shunt resistor 123 returns the grid of tube 116 to bias 120 in the absence of drive signal. The screen grids of tubes 116 and 118 are connected to the positive terminal of voltage supply 84 through resistors 126 and 128, respectively. The amplified signal outputs from tubes 116 and 118 pass through coupling capacitors 130 and 132 as indicated. Resistor 125 is connected in shunt with capacitor 130. Tube 143 has its cathode connected to the negative terminal of main power supply 80 and its plate connected to its positive terminal through the primary winding of transformer 33. A parallel-connected protective network includes serially connected thyrite cell 246 and damping diode 248. Tube 143 further has its grid bias furnished by bias voltage supply 133 with diode 134 and resistors 136, 71 connected as shown.

It is the function of the circuit of FIGURE 1 to provide a pulsed output to transformer 33 with the frequency preset according to the multivibrator setting by the capacitor switches 90, 92. The gap pulse on-time or duty factor as has previously been indicated is limited by the reverse voltage characteristic of transformer 33.

FIGURE 2 shows the output stage of an electrical discharge machining power supply adapted to provide extended on-time operation. Connected to the secondary of transformer 33 is a rectifier 145 and a relatively large magnitude capacitor 146. Capacitor 146 is preferably of the electrolytic type. A second smaller magnitude capacitor 148 is connected between point X and the machining gap. The machining gap comprises, in the present instance, a workpiece 147 of negative polarity and a tool electrode 149 of a positive polarity. Also connected in series between the transformer secondary and the gap is a current limiting resistor 150. Responsive to a pulse input through transformer 33, capacitor 146 is charged through rectifier 145 and discharged through resistance 150 across the machining gap. Since capacitor 146 is of relatively large value, it maintains a substantially constant current to the gap. Capacitor 148 operates as a relatively smaller magnitude "arc extinction surge" capacitor. Because of its manner of connection in the circuit, capacitor 148 is charged to a reverse polarity which is sufficiently negative to extinguish the arc yet insufficient to fire the gap with a polarity reverse to that shown. The mode of operation of the circuit of FIGURE 2 will be further explained in connection with the waveforms of FIGURE 3 in the section "Description of Operation," hereinafter.

The circuit of FIGURE 4 is substantially similar to that of FIGURE 2 insofar as the connections of transformer 33, rectifier 145 and capacitor 146 are concerned. The relatively small magnitude arc extinction or turn-off capacitor 148 is connected in series with a silicon controlled rectifier 152 across the gap. While the present invention discloses a circuit incorporating a silicon controlled rectifier, my invention is not so limited. Any electronic trigger device may be utilized in the circuit. By "electronic trigger device" I mean an electronic switch of the type which is triggered on at its control electrode by a pulse and turned off by reverse voltage applied for a sufficient time across its principal electrodes. Included within this definition by way of example are ignitrons, thyratrons, and semiconductor controlled rectifiers. A diode 154, fixed resistor 156, and potentiometer 158 are connected between the upper terminal of capacitor 148 and the cathode of rectifier 145. A resistor 160 is connected between the gate of silicon controlled rectifier 152 and a reference voltage source indicated on the schematic as ground. Zener diode 162 is connected across the gate and cathode of silicon controlled rectifier 152 as a protective device. It is the function of silicon controlled rectifier 152 to skip pulses to the end that the pulse output to the gap may be selectively reduced in frequency. This low frequency is particularly important to achieve "no-wear" in graphite electrode machining. The mode of operation of the circuit of FIGURE 4 will be explained more fully with reference to the voltage waveforms of FIGURE 5 in the section entitled "Description of Operation," hereinafter.

The circuit of FIGURE 6 is similar to the circuits of FIGURES 2 and 4 insofar as the operation of the arc extinction capacitor 148 is concerned. Whereas the earlier circuits required a pulsating DC source to initiate machining operation, the circuit of FIGURE 6 utilizes a constant DC supply indicated by the numeral 164. Current limiting resistor 150 is also used in series between the source 164 and the machining gap. Upon initial open arc turn-on, the voltage surge through capacitor 148 fires controlled rectifier 152 through resistor 166 whose magnitude is selectively adjustable as shown. A parallel RC network including resistor 168 and capacitor 170 is connected to the output of silicon controlled rectifier 152. Transistor 172 is connected as shown with its base and emitter circuit connected across capacitor 170 through resistor 174. A suitable protective diode 162 is connected across the base-emitter junction of transistor 172. In this circuit, the conduction current of controlled rectifier 152 is stored on capacitor 170 to cause transistor 172 to conduct. In its conducting state, transistor 172 bypasses keep alive current from controlled rectifier 152 and insures its turn-off. It is the function of controlled rectifier 152 to remain in its conductive state and maintain gap conduction so long as current flow through resistor 166 continues, i.e., until capacitor 148 charges fully to a reverse polarity as shown and arc extinction occurs. A diode 178 may be connected across the machining gap to prevent any reverse AC conduction across the gap.

DESCRIPTION OF OPERATION

The description of operation of the circuit of FIGURE 2 will now be made with reference to the waveform diagram of FIGURE 3. As has been previously indicated, the secondary of transformer 33 is furnished with a unidirectional pulse output from the pulse generator of FIGURE 1. The polarity indicated at the machining gap is that whereby the work is maintained negative and the electrode positive. As a power pulse of rectangular shaping is passed through transformer 33, capacitor 146 will be charged through rectifier 145 and discharged through resistor 150 as a DC source into the machining gap. Capacitor 146 is of relatively large capacitance value so that a substantially constant current is furnished to the gap. Capacitor 148 serves as the arc extinction or turn-off capacitor and is of relatively smaller magnitude. Because of the connection of capacitor 148 at the terminal between the transformer secondary and rectifier 145, it will be charged to a polarity to render electrode 149 sufficiently more negative than the workpiece 147 to extinguish or turn-off the arc. The time duration of the turn-off will be relatively short as indicated by FIGURE 3 which illustrates the brief negative excursion of voltage at turn-off. The reverse polarity to which capacitor 148 is charged will, however, normally be insufficient to cause actual firing of the gap with a reverse polarity. In some cases it will be advisable to perform the machining operation with reverse polarity gap firing. FIGURE 3 shows the time period measured from point $a$ to point $b$ when capacitor 148 turns-off the arc. During the period measured from point $b$ to $a$, capacitor 146 is furnishing through its discharge a relatively constant current machining pulse to the gap. Comparison of the upper waveform to the lower waveform illustrates the machining pulse on-time lengthening that is made possible by my invention. Point $c$ indicates the disturbance transient which is caused by the turn-off of the power pulse furnished by the pulse generator. I have found that employment of the circuit of FIGURE 2 together with that of FIGURE 1 permits the extension of machining pulse on-time to as high as 90 to 98%.

The description of operation of the circuit of FIGURE 4 will now be made with particular reference to the voltage waveform of FIGURE 5. The circuit of FIGURE 4 is basically similar to that of FIGURE 2 in that a gap extinction or turn-off capacitor is utilized in conjunction with a DC source to literally punch holes in the DC output to provide relatively long on-time pulses to the gap. In the FIGURE 4 circuit, turn-off capacitor 148 has its upper terminal connected to the junction between the transformer 33 secondary and rectifier 145 so that it will be charged to a polarity which is the reverse of the normal gap polarity imposed by the DC source. Capacitor 148 is of relatively smaller capacitance as compared to capacitor 146. The additional feature incorporated in the FIGURE 4 circuit is that of "pulse skipping" in which the frequency of the machining pulse output may be selectively reduced in the output circuit as required. The pulse skip operation is illustrated in FIGURE 5 with the pulse skip period falling between $t_1$ and $t_2$. The voltage waveform shows the equal area AC voltage being passed by transformer 33. During the periods between $t_2$ to $t_3$ and $t_4$ to $t_5$ the pulse generator is off. During the periods $t_1$ to $t_2$ and $t_3$ to $t_4$ the pulse generator is on. It will be seen that diode 154, resistor 156, and variable resistor 158 serve to step charge capacitor 148 so that at $t_2$ the first pulse will charge it to point $A_1$. During the second pulse, capacitor 148 will be charged more negatively to point $A_2$. As the upper plate of capacitor 148 and the cathode of control rectifier 152 become negative with respect to the gate, the control rectifier will fire and, in effect, momentarily short circuit the gap. During the first negative going pulse indicated between $t_1$ and $t_2$ the pulse skipping will occur, since control rectifier 152 is in its non-conductive state and the pulse turn-off by capacitor 148 does not occur. Because diode 154 blocks during the off-time period between $t_2$ and $t_3$ and since control rectifier 152 cannot conduct direct current through capacitor 148, controlled rectifier 152 will turn off during the pulse off-time. It is the function of adjustable resistor 158 to control the charge rate of capacitor 148 so that skipping of one or more pulses may be provided to selectively lower the frequency of machining pulses provided to the gap.

The circuit of FIGURE 6 differs from the prior embodiments of my invention in that it is self operating and does not require the initiating action of a unidirectional pulse generator such as that disclosed in FIGURE 1. A constant DC source 164 is employed as shown. On initial current surge through capacitor 148, controlled rectifier 152 will be fired through variable resistor 166 with the conduction of controlled rectifier 152 maintained until capacitor 148 is fully charged. Transistor 172 is included in the circuit to insure turn-off of controlled rectifier 152. The proper timing of this turn-off is accomplished since any conduction current passing through resistor 168 and stored on capacitor 170 will cause transistor 172 to be triggered on and to bypass current passing through resistor 156 and 158. Therefore, that current required to maintain controlled rectifier 152 conductive is removed so that it must turn-off. Controlled rectifier thus stays on only so long as current continues to flow through resistor 166. Depending on the operating characteristics of transistor 172, a suitable amplifier stage may be included. A gap diode 178 with a polarity as shown may be included in the circuit if it is required to prevent reverse voltage firing of the gap. As capacitor 148 recharges to the required negative voltage, resistor 166 functions again as a gate signal divider to fire controlled rectifier 152 and the cycle is repeated. The basic operation of the FIGURE 6 circuit is similar to the other embodiments shown in that a reverse polarity charged capacitor is used to turn-off the gap power for a brief time duration between consecutive machining pulses. The circuit of FIGURE 6 provides a low frequency, long on-time pulse output with the frequency of pulse output determined by the magnitude of resistor 158 and capacitor 148. Resistor 166 is adjustable as shown so that control rectifier 152 will fire at the desired voltage level of capacitor 148.

It will thus be seen that I have provided a new and improved low frequency, long on-time machining power supply for electrical discharge machining. My invention may be utilized in conjunction with a pulsating DC power source or with a constant DC power source after the manner indicated by my FIGURE 6 embodiment. In either case, an important feature of the invention is that the machining pulse duration is determined by the reverse polarity charging of a storage means such as a capacitor suitably connected betwen the source and the gap for providing a brief duration turn-off.

I claim:

1. In an electrical discharge machining apparatus for machining a conductive workpiece by a tool electrode across a dielectric coolant filled gap, a machining power circuit comprising a power source, an electronic triggering device operatively connected to said gap, a parallel RC network connected in series with said source and said triggering device for firing it and initiating gap pulses, said capacitor in said RC network chargeable to a reverse polarity to provide pulse turn-off.

2. The combination as set forth in claim 1 in which a means is operatively connected to said electronic triggering device for insuring its turn-off.

3. The combination as set forth in claim 2 in which said means comprises an electronic switch having a pair of principal electrodes and a control electrode, said principal electrodes connected in shunt with said electronic triggering means, said control electrode and one of said principal electrodes connected across the control circuit of said electronic triggering device.

4. In an electrical discharge apparatus for machining a conductive workpiece by a tool electrode across a dielectric coolant filled gap, A machining power circuit comprising a power source, a periodically operated electronic switch, a transformer having a primary and a secondary winding, said source and said switch operatively connected to said primary winding for providing pulses thereto, said secondary winding connected in series with a rectifier across said gap, a relatively large magnitude capacitor connected across the series combination of said rectifier and said secondary winding, and a relatively small magnitude capacitor connected in series between said secondary winding and said gap for extinguishing gap conduction by charging to a reverse gap polarity, said first mentioned capacitor operable to discharge to maintain gap conduction for a predetermined time subsequent to the operation of said first capacitor.

5. In an electrical discharge machining apparatus for machining a conductive workpiece by a tool electrode across a dielectric coolant filled gap, a machining power circuit comprising a power source, a periodically operated electronic switch, a transformer having a primary and a secondary winding, said primary winding operatively connected to said switch and said source for providing pulses to said primary, said secondary operatively connected across said gap, and a capacitor connected in series with said secondary winding and said gap, said capacitor chargeable to a reverse polarity for extinguishing said gap at controllable time intervals to provide relatively long on-time machining pulses to said gap.

6. In an electrical discharge machining apparatus for machining a conductive workpiece by a tool electrode across a dielectric coolant filled gap, a machining power circuit comprising a power source, means for connecting said source across said gap with a given polarity, an electronic triggering device having a pair of principal electrodes and a control electrode, said device having its principal electrodes connected in series combination with a capacitor, said series combination connected across said gap, said capacitor connected to said source and chargeable by said source to a reverse polarity to periodically extinguish said gap to provide spaced machining pulses thereto, said electronic triggering means having its control electrode and one of its principal electrodes operatively connected across said capacitor for firing it to initiate each of said pulses.

7. The combination as set forth in claim 9 wherein said triggering device comprises a silicon controlled rectifier having its gate and cathode connected in series with a resistor across said capacitor.

References Cited
UNITED STATES PATENTS 3,089,059  5/1963  Porterfield et al. _____ 315—180

JOHN W. HUCKERT, Primary Examiner

J. R. SHEWMAKER, Assistant Examiner

U.S. Cl. X.R.

315—224, 225, 239